H. S. PIERCE.
DRIVE CHAIN COUPLING.
APPLICATION FILED AUG. 15, 1910.
1,013,054.
Patented Dec. 26, 1911.
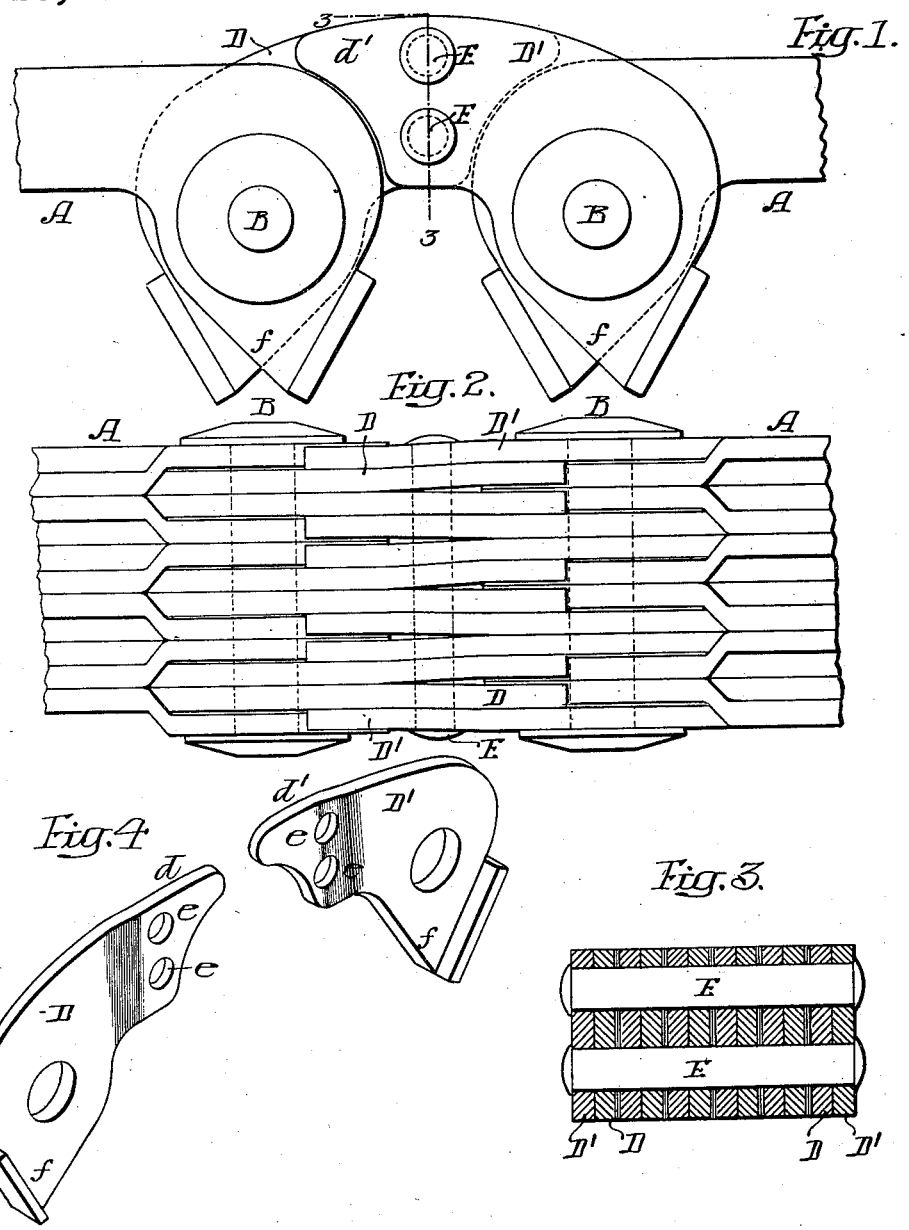
Inventor.—
Harold S. Pierce.
by his Attorneys.

UNITED STATES PATENT OFFICE.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

DRIVE-CHAIN COUPLING.

1,013,054. Specification of Letters Patent. Patented Dec. 26, 1911.

Application filed August 15, 1910. Serial No. 577,190.

*To all whom it may concern:*

Be it known that I, HAROLD S. PIERCE, a citizen of the United States, residing in Philadelphia, Pennsylvania, have invented certain Improvements in Drive-Chain Couplings, of which the following is a specification.

The object of my invention is to provide a coupling for drive chains, particularly of the type in which the link plates are provided with teeth which engage the teeth of sprocket wheels. It is very difficult to couple the ends of a drive chain of this type as it is made up of a series of link plates placed side by side and it is the ordinary practice to use a pivot pin as a coupling. By the present invention a series of sectional link plates are used. One section is attached to one end of the chain and the other section is attached to the opposite end of the chain so that when it is necessary to couple the chain, two sections are intermeshed and one or more rivets passed through openings in the sections, so as to firmly secure them together.

In the accompanying drawings, Figure 1 is a side view of sufficient of a drive chain to illustrate my invention; Fig. 2, is a plan view; Fig. 3, is a transverse sectional view on the line 3—3, Fig. 1; Fig. 4 is a perspective view of one of the sectional link plates.

A are the links of a chain. Each link is made up of a series of plates placed side by side and the plates of one link intermesh with the plates of an adjoining link and a pivot pin B couples the several link plates together. The links can be coupled either with or without bushings, as desired. The plates of the links are usually spaced apart on the pivot pins so as to reduce the side friction.

D and D' are two link plate sections, each being practically one-half of a link plate and the ends $d$ of the sections D extend past the ends $d'$ of the sections D', as illustrated clearly in Figs. 1 and 2. When the several link plate sections are assembled, as illustrated in Fig. 2, rivets E—E, two in the present instance, are passed through the openings $e$ in the plate sections D—D' and the ends riveted over the end link plate sections, as clearly illustrated in Fig. 2, making a substantial and rigid fastening so that the link made of plates in two sections is practically the same as the other links made of integral link plates.

When it is wished to disconnect the chain all that is necessary is to reduce the rivet heads and force the rivets out of the openings, after which the sections can be separated. Thus by this construction the pivot pins of the links are not disturbed.

I preferably offset the link plate sections, as shown in Fig. 2, so that it is not necessary to place washers between the several sections, although they may be straight in some instances, and washers placed between the sections without departing from the essential features of the invention.

My invention is particularly applicable to drive chains having teeth $f$—$f$, as shown, but it may be used in connection with plain chains not provided with teeth.

I claim:

1. The combination in a chain, of two end links made up of a series of plates, with a series of coupling plates connecting the two end links, each plate being made of two sections, one section overlapping the other section, and means for fastening the several sections.

2. The combination in a chain of two end links, each made up of a series of plates, the plates of each link being spaced apart, with a series of coupling plates, each coupling plate being made in two parts, one part overlapping the other, and each part having rivet holes, and rivets extending through all the sections of the coupling plates.

3. The combination in a chain having two end links each made up of a series of plates spaced apart, with coupling links made of a series of plates, the plates of each series being made in two sections, the sections being offset, and rivets coupling the series of sections together forming a link.

In testimony whereof, I have signed my name to this specification, in the presence of two subscribing witnesses.

HAROLD S. PIERCE.

Witnesses:
 WM. E. SHUPE,
 WM. A. BARR.

Copies of this patent may be obtained for five cents each, by addressing the "Commissioner of Patents, Washington, D. C."